United States Patent
McGinn et al.

(10) Patent No.: US 9,348,334 B2
(45) Date of Patent: May 24, 2016

(54) CONTROL INTERFACE FOR A SEMI-AUTONOMOUS VEHICLE

(71) Applicant: THE PROVOST, FELLOWS, FOUNDATION & SCHOLARS, & THE OTHER MEMBERS OF THE BOARD, OF THE COLLEGE OF THE HOLY & UNDIV. TRINITY OF QUEEN ELIZABETH NEAR DUBLIN, Dublin (IE)

(72) Inventors: Conor McGinn, Howth (IE); Mark Culleton, Arklow (IE)

(73) Assignee: The Provost, Fellows, Foundation Scholars, and the Other Members of Board of the College of the Holy and Undivided Trinity of Queen Elizabeth Near Dublin College Green, Dublin (IE)

( * ) Notice: Subject to any disclaimer, the term of this patent is extended or adjusted under 35 U.S.C. 154(b) by 394 days.

(21) Appl. No.: 14/080,333

(22) Filed: Nov. 14, 2013

(65) Prior Publication Data

US 2014/0132082 A1    May 15, 2014

(30) Foreign Application Priority Data

Nov. 14, 2012   (GB) .................................. 1220468.1

(51) Int. Cl.
*G05D 1/00*   (2006.01)
*G05B 7/00*   (2006.01)
*A61G 5/04*   (2013.01)

(52) U.S. Cl.
CPC ................ *G05D 1/0061* (2013.01); *A61G 5/04* (2013.01); *A61G 2203/14* (2013.01); *A61G 2203/16* (2013.01); *G05D 2201/0206* (2013.01); *Y10T 307/826* (2015.04)

(58) Field of Classification Search
CPC .......................................................... G05B 7/00
USPC .......................................................... 307/326
See application file for complete search history.

(56) References Cited

U.S. PATENT DOCUMENTS

| | | | |
|---|---|---|---|
| 4,323,829 A | 4/1982 | Witney et al. | |
| 5,867,111 A | 2/1999 | Caldwell et al. | |
| 6,108,592 A | 8/2000 | Kurtzberg et al. | |
| 6,842,692 B2 | 1/2005 | Fehr et al. | |
| 6,926,106 B2 | 8/2005 | Richey, II et al. | |
| 2008/0030077 A1 | 2/2008 | Tiry et al. | |
| 2010/0174432 A1 | 7/2010 | Meyer | |

FOREIGN PATENT DOCUMENTS

| | | |
|---|---|---|
| CN | 202060996 U | 12/2011 |
| EP | 0314241 A1 | 10/1988 |
| EP | 1774944 A2 | 4/2007 |
| EP | 2302480 A1 | 3/2011 |
| JP | H08194637 A | 7/1996 |
| JP | 2003220096 A | 8/2003 |

*Primary Examiner* — Robert Deberadinis
(74) *Attorney, Agent, or Firm* — K&L Gates LLP (57) ABSTRACT

The invention provides a control interface configured to cooperate with a vehicle, such as a wheelchair or mobile robot, said interface comprising at least one sensor is adapted to detect the presence of at least one finger of a user and to act as a switching mechanism between manual and autonomous control of the vehicle. The invention provides a highly intuitive and effective means of switching between automatic and manual vehicle control-no user training required. The control interface allows for user to be comfortable in an autonomous vehicle—users can instantly gain full control when needed.

17 Claims, 7 Drawing Sheets

CONTROL INTERFACE FOR A SEMI-AUTONOMOUS VEHICLE

CROSS REFERENCE RELATED APPLICATIONS

This application claims priority to and the benefit of United Kingdom Application No. GB1220468.1 filed on Nov. 14, 2012, the entire disclosure of which is incorporated by reference herein.

FIELD

The invention relates to a control interface. In particular the invention relates to a control interface for a semi-autonomous vehicle, such as a wheelchair or mobile robot.

BACKGROUND

There are currently a number of controllers which allow for both human and autonomous control. However these controllers are developed with individual, long term use in mind, and so often require specific user adaption and training in order to be operated correctly. As well as this, the control algorithm is often developed for people with severe disabilities, and thus autonomous control is given precedence to manual control, for example as disclosed in U.S. Pat. No. 6,842,692. Inventors: Fehr; Linda et al.

A device has been found that that allows the user to manually control the wheelchair, with object detection used to prevent collision, as described in European Patent Publication No: EP2302480A1, Inventor: Smithers, Tim. However the autonomous control of the device is inherently reactive and is limited to augmenting the path of the wheelchair to avoid objects in its local vicinity, which means that fully autonomous control is not possible.

Current wheelchairs with autonomous control receive commands from the user using methods such as voice recognition and switches such as the aforementioned U.S. Pat. No. 6,842,692 and U.S. Pat. No. 6,108,592 and EP1774944A2. Another device uses a speed and control touchpad U.S. Pat. No. 6,926,106, however the device is not used for autonomous control, but as a replacement for the traditional joystick. Other patent publications in the art include U.S. Pat. No. 4,323,829; JPH08194537; US2008/300777; US2010/174432; JP20032200096; EP0314241; CN202060996 and U.S. Pat. No. 5,867,111, however none of these publications provide a reliable control interface for a semi-autonomous vehicle.

It is therefore an object to provide an improved control interface for a vehicle to provide both manual and autonomous modes.

SUMMARY

According to the invention there is provided control interface configured to cooperate with a vehicle, such as a wheelchair or robot, said interface comprising at least one sensor adapted to detect the presence of at least one finger of a user and to act as a switching mechanism between manual and autonomous control of the vehicle.

The invention provides a highly intuitive and effective means of switching between automatic/autonomous and manual vehicle control—no user training required. The control interface allows for the user to be comfortable in an autonomous vehicle—users can instantly gain full control when needed. Also users can easily augment the speed during periods of autonomous operation. The interface provides a wheelchair control device that can be used equally efficiently by left and right handed users with no adaptation.

The controller itself contains a plurality of sensors including several tactile sensors and a joystick. The controller is connected to an on-board computer which is in turn connected to a plurality of sensors used for navigation, object detection etc. When neither the tactile sensors or joystick are activated, the vehicle is in a 'stop' mode and will remain stationary—only physically moving the joystick or triggering the tactile sensor will cause the vehicle to move. When the tactile sensor(s) are activated, the vehicle will operate autonomously whereby the on-board computer will assume full control of the vehicle.

Independent of the specific embodiment, the magnitude of the tactile sensor's measurement (the extent to which the user is triggering the tactile sensor—measured on a sliding scale) will determine the 'confidence' that the user has in the on-board computer's control—if the tactile sensor reads a low engagement (for example user only has one finger on the touchpad sensor), then the on-board computer understands that the user is not fully content that the vehicle is performing to satisfaction. In response it will likely slow down and its behaviour will be such to appease the user (prompt the user for additional instruction etc.). Similarly if the tactile sensor reads high engagement (for example if the user has 3-4 fingers placed on touchpad sensor) the confidence is high and the vehicle will operate at higher speeds and be less sensitive to user input.

In one embodiment there is provided at least one sensor comprises a touch/tactile sensor.

In one embodiment there is provided a joystick control adapted to provide manual control.

In one embodiment when one or more tactile sensors are touched by the user the vehicle is in an automatic/autonomous mode.

In one embodiment, the number of sensors touched by the user determines the navigation confidence of the vehicle.

In one embodiment when neither the joystick nor the tactile sensors are touched by the user, the vehicle is in a 'stopped' mode. In the stopped mode the vehicle remains stationary until the user re-engages with the joystick or tactile sensor.

In one embodiment a processor comprises a module for generating confidence weighting based on the user data collected from the sensor and/or a joystick wherein said weighting affects the speed at which the vehicle.

In one embodiment a low confidence score weighting will generate a command from the processor to slow the vehicle and make the processor more sensitive to its surroundings.

In one embodiment a high confidence score weighting generated will reinforce the processor control output and consequently the vehicle can travel faster than in a low confidence mode.

In one embodiment an additional switch is added to the control unit which also contains a tactile sensor(s) and joystick. This switch enables the user to select which actuated mechanism the control unit should act on (in a mechanism consisting of several actuated degrees of freedom).

In one embodiment the weighing calculates the running average over a pre-determined period of time of whether the user has their hand over the sensor or a joystick.

In one embodiment a value of close to '0' indicates that the user is controlling exclusively using the joystick.

In one embodiment a value of close to '1' indicates that the sensor is being used.

In one embodiment a second weighting can be calculated to calculate the rate of change of a first weighting indicative of how fast the user is going from autonomous to tele-operated control (or remote control operated) such that the second weighting will indicate periods when the user has assumed control of the vehicle for a particular reason.

In one embodiment a processor will analyse the choices the user made during these periods such that when a similar situation is reached in the future, the processor will be able to better predict the desired behaviour.

In a further embodiment there is provided a control interface configured to cooperate with a vehicle, such as a wheelchair, said interface comprising at least one sensor is adapted to detect the presence of at least one user input from a user and to act as a switching mechanism between manual and autonomous control of the vehicle.

In another embodiment there is provided a method controlling a vehicle, such as a wheelchair or robot, comprising the steps of:

configuring a control interface to cooperate with the vehicle;

detecting the presence of a least one finger on the control interface and calculating a navigation confidence weighting; and switching between manual and autonomous control of the vehicle based on said confidence weighting.

In a further embodiment there is provided a semi-autonomous robotic vehicle comprising a control interface having a plurality of sensors, each sensor is adapted to detect the presence of a resting finger of a user and to act as a switching mechanism for autonomous control of the vehicle.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The invention describes a control interface suitable for a semi-autonomous vehicle. In the context of the present invention 'semi-autonomous' should be interpreted to mean a vehicle, such as a wheelchair but not limited, that can navigate autonomously and under the direct control of a person.

Figure 1:
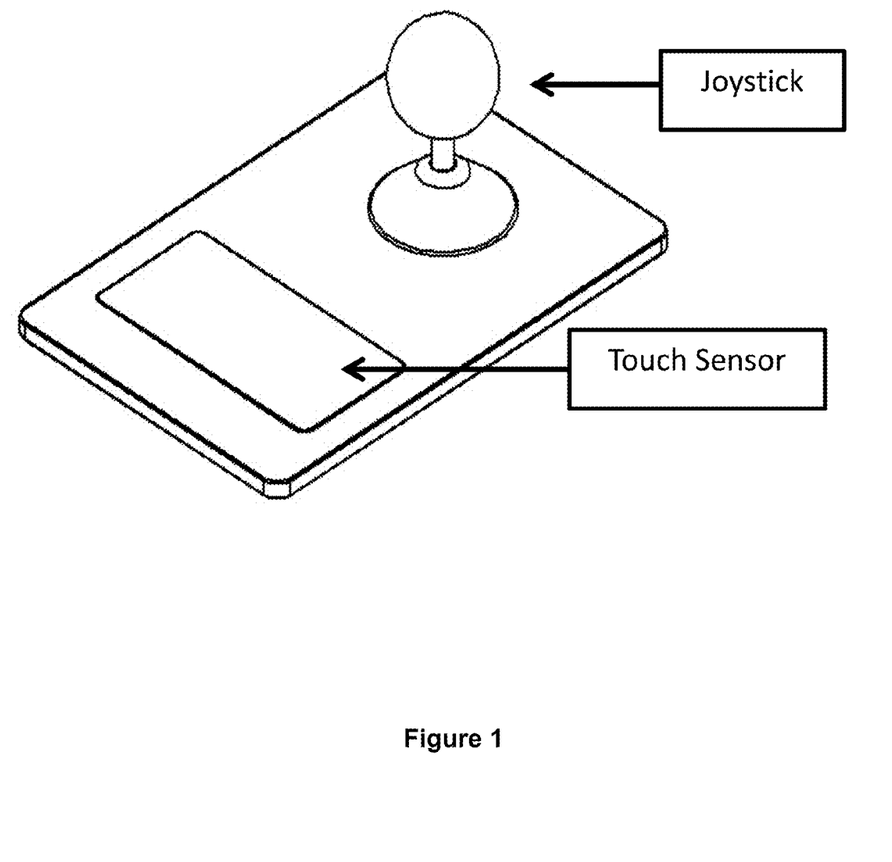
FIG. 1 illustrates a preferred embodiment of the control interface according to one aspect of the invention.

Referring to FIG. 1 illustrates a control interface according to one embodiment of the invention. The control interface can be adapted to be fitted to a vehicle, such as a wheelchair (not shown) or a robot, wherein the control interface can be in communication with the robot via a wireless communication link or other communication means. The interface comprises at least one sensor referenced by a tactile sensor or touch panel that a user can communicated in a tactile manner and a joystick adapted to allow for manual operation of the vehicle. In the context of the invention the two terms 'tactile sensor' and 'touch sensor' can be used interchangeably and should be interpreted broadly.

Figure 2:
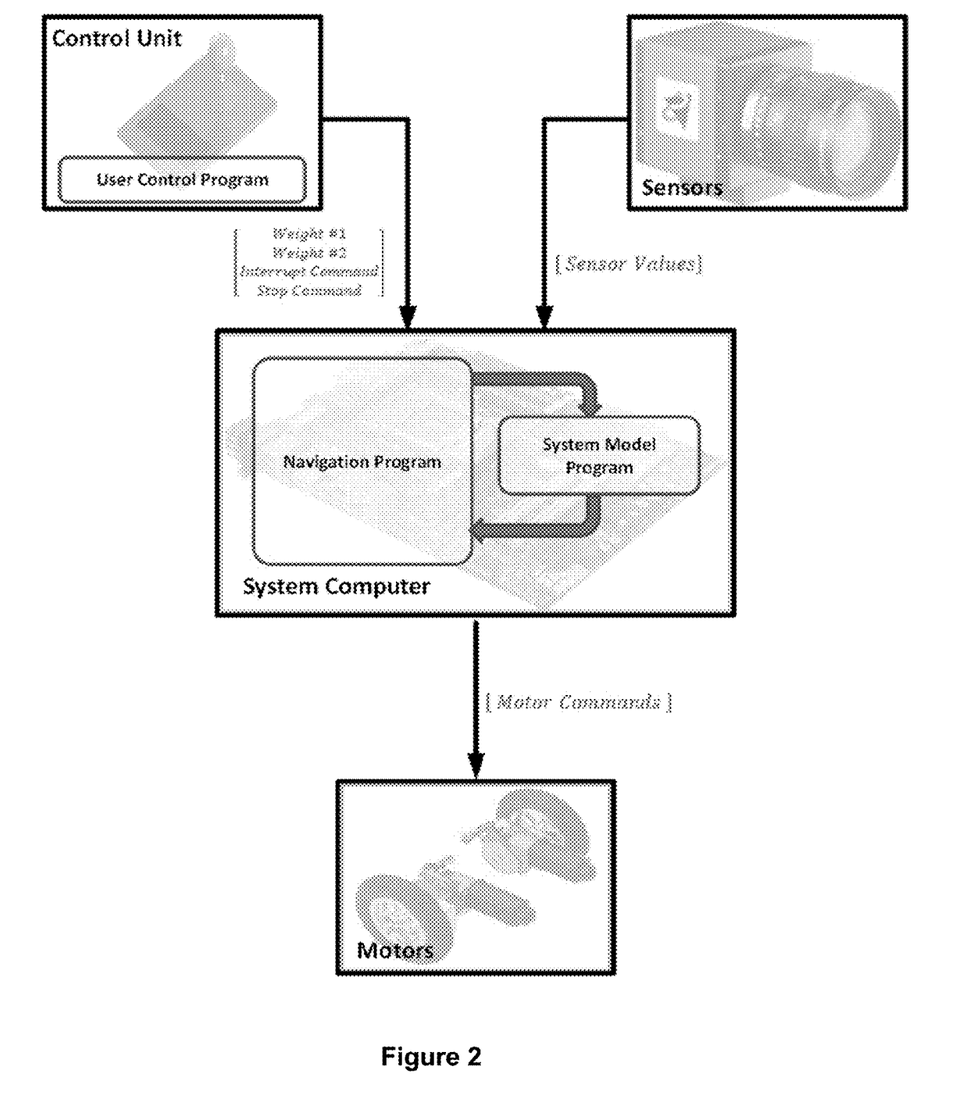
FIG. 2 illustrates the control interface of FIG. 1 in communication with a system computer.

FIG. 2 illustrates the control interface of FIG. 1 in communication with a system computer, housing a processor, that receives data from a plurality of sensors and the control interface. The processor processes the information which controls movement of the vehicle. FIG. 2 shows the system computer sending control instructions to motors to control the movement/speed of the vehicle. Both the control unit and on-board sensors feed into the system computer. Both the sensor readings and the user control inputs are used by the system computer when controlling the vehicles motion.

In use, when the user wants to control the vehicle manually, the user can steer the vehicle using a joystick. When the user wants to enable autonomous control, the user uses their fingers to activate the tactile sensors. In one embodiment this involves resting their fingers on a touch sensitive panel shown in FIG. 1 and FIG. 2. The number of fingers that the user places on the panel determines a confidence weighting, or confidence score, that the user has in the on-board computers control and as such will affect the speed at which the vehicle travels. Low confidence will serve to slow the vehicle and make the on-board computer more sensitive to its surroundings. High confidence will reinforce the on-board computers control output and consequently the vehicle can travel faster than in low confidence' mode.

When the user wants to stop the vehicle, they release their fingers from the tactile sensors and do not activate the joystick. If the joystick is displaced and the touch panels are activated simultaneously, the vehicle assumes manual operation and obeys the joystick commands in a conventional manner. The joystick employed on the vehicle can be effectively a circuit of switches, according to one embodiment. When the joystick is displaced in a given direction, a micro-switch that corresponds to the direction is closed. This forms a closed circuit which can be detected at the joystick's terminals. The joystick can sense eight directions (UP, UP-RIGHT, RIGHT, DOWN-RIGHT, DOWN, DOWN-LEFT, LEFT, UP-LEFT). This is an off-the shelf component and is easily available. It will be appreciated that the form that the joystick takes may take many forms both physical and virtual, for example, a potentiometer whose output corresponds to a direction or an ipad app with a touch joystick would work equally well.

The touch panels or sensors can be capacitive touch sensors—change in capacitance when touched. It will be appreciated that the sensors can be resistive touch sensors—change in resistance when touched or a touch controlled potentiometer—change in resistance when rotated. Each panel can be made from a conductor (for example copper). Soldered directly to the panel are two wires that lead to the I/O terminal pins of a microcontroller. Each wire has a resistor attached to it—one resister is large (~1M Ohm) while the other is small (~1 kOhm). The wire with the large resistor is connected to an OP pin on the microcontroller while the wire with the small resistor is connected to an IP pin. A constant (weak) signal is transmitted from the OP pin and is measured by the IP pin. When a person (or any large conductive entity) touches the touchpad, a change in voltage is detected by the IP pin. By measuring the rate of change of this voltage it is possible to ascertain if somebody is touching the panel and estimate the contact area. It will be appreciated that the specific embodiment that detects the presence of fingers is not important and can take many forms, and are described to show one implementation of the invention.

Figure 3:
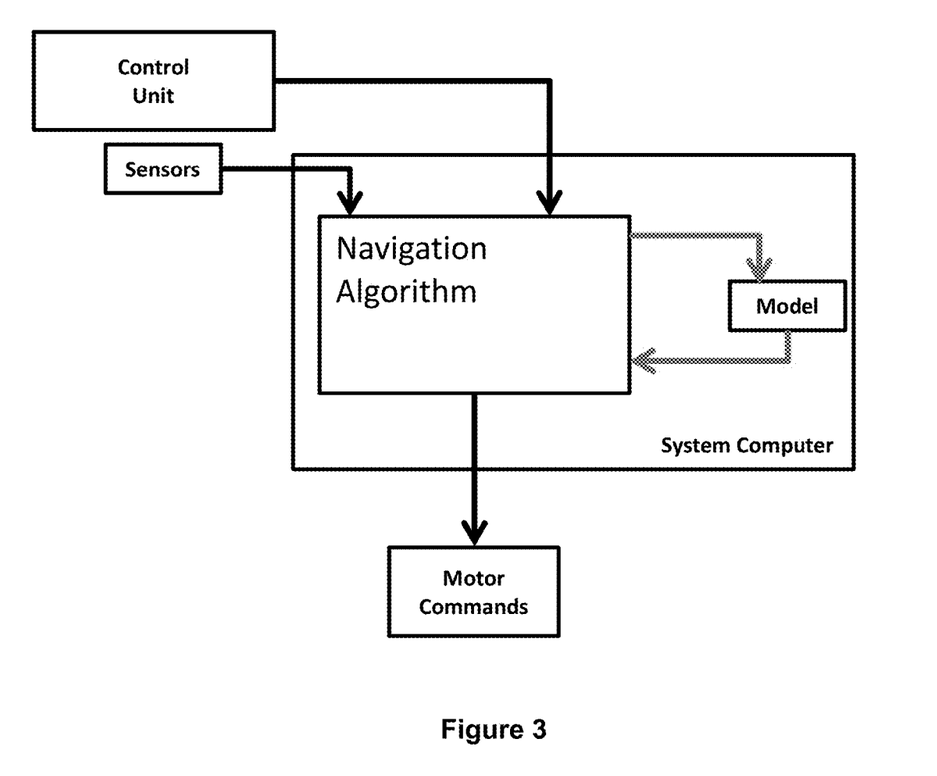
FIG. 3 illustrates a high level block diagram showing how information flows in the control system.

Referring to FIG. 3 both the joystick and the touch sensitive panel are connected to a microcontroller which controls the output of the control unit. In one embodiment the following pseudo-code describes the algorithm running on the microcontroller:

1. Read Sensors at X Hz
   Store values in separate arrays containing the previous n samples (i.e. two arrays holding previous values of the joystick ($S_j$) and tactile sensor ($S_t$) respectively)
2. Compute Weight #1—Confidence Weight
   Read both tactile and joystick sensor
   Will be approximately equal to:

$$W_1 = \frac{\sum_{i=0}^{n}(K_j S_{j,i} + K_t S_{t,i})}{2n}$$

where $(K_j + K_t) = 1$ $(K_j \gg K_t)$

3. Compute Weight #2—Interrupt Weight
   Locate large gradients that have occurred and since resumed previous values
      Can be computed by simple 1D convolution filter (i.e. 1D Canny edge detector)
4. If Weight #2>0 (i.e if joystick activation is detected)
   Evaluate Weight #1 at the time of gradient
   If Weight #1<threshold (i.e. below a low confidence), pass control argument to the navigation algorithm (i.e. if the joystick was pushed in the UP direction pass 'UP' to the navigation algorithm)
5. Pass 4 arguments from control unit to navigation algorithm for consideration.
   i. Weight #1—typical value: (0<weight1<1)
   ii. Weight #2—typical value: (0<weight2<1)
   iii. Interrupt Command—typical value: ('_' 'UP' 'LEFT' 'RIGHT' etc.)
   iv. Stop command—typical value: (0/1)

Figure 4:
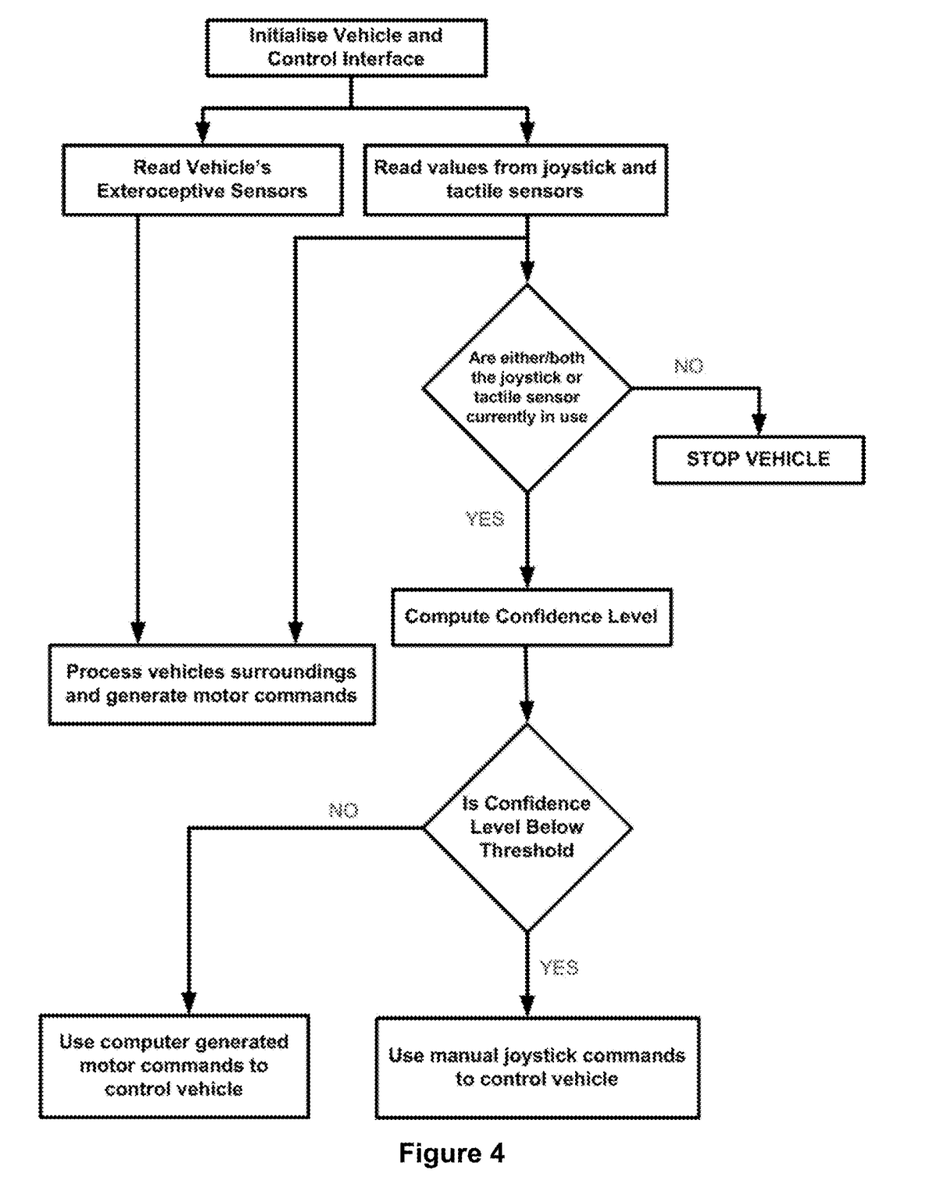
FIG. 4 illustrates a flowchart showing the steps of operation of the control interface according to one embodiment.

FIG. 4 illustrates a flowchart showing the steps of operation of the control interface according to one embodiment. The vehicle and control interface is initialised. If both the joystick or sensor are not in use the vehicle is stopped. Depending on whether the user is controlling the touchpad or the joystick a confidence weighting or level is calculated. This weighting is used as an input to the navigation algorithm and will serve such that the user can augment the behaviour of the autonomous system without resuming full control (i.e. stop/slow, select a path at a junction). This weighing calculates the running average (over a pre-determined period of time) of whether the user has their hand over the touchpad or the joystick. A confidence value ~0 indicates that the user is controlling exclusively using the joystick where as a confidence value ~1 indicates that the touchpad is being used. If the confidence level is below or above a certain threshold appropriate control can be initiated to the vehicle.

In addition to the first weighting value, the navigation algorithm uses inputs from sensors and its model of the world to calculate where/how it should move. This world model is constantly evolving and is updated regularly. One way in which this occurs is via machine learning from analysis of the users control behaviour. A second weighting which calculates the rate of change of the first weighting (how fast the user is going from autonomous to tele-operated control) will indicate periods when the user has assumed control for a particular reason. The system will analyse the choices the user made during these periods (where it occurred, what the user did etc.) such that when a similar situation is reached in the future, the model will be able to better predict the desired behaviour.

The control commands that get sent to the motors of the vehicle are the primary output of the navigation algorithm which factors the control interface as only one of its inputs. When the user releases the tactile sensor and joystick, it is the algorithm that is responsible for turning off the motors not a relay or mechanical switch. Therefore even if the user is remote controlling the vehicle into an obstacle, (because the user never has 100% direct control) the sensor inputs that identify the obstacle will override the user input and the system will avoid collision.

Example Embodiments

The software running inside the internal computer can have a number of sub-programs running. A first program determines the weightings from the control unit. There are two different weighing factors that can be used:

Program #1—Associated with Getting Information from the User Control Panel

Control Weight #1—Time Averaged Confidence Weight

The first weighting is a normalised numeric value (between 0 and 1) that represents the 'confidence' at which the user has in the robot to control the behaviour of the system autonomously. During periods of 'low-confidence' (i.e. when the user operates the joystick) this running value moves towards zero. Similarly when the user is confident that the autonomous algorithm is performing to satisfaction (i.e. when the user operates the tactile sensor) the value moves towards 1. As the weight is determined from a continuous signal normalised over time, it effectively operates as a low pass filter.

A formula that would demonstrate the required behaviour is given by:

$$W_1 = \frac{\sum_{i=0}^{n}[K_j S_{j,i} + K_t(1 - S_{t,i})]}{n}$$

Where:
$(K_j + K_t) = 1$
$(K_j \gg K_t)$
$0 < s_j < 1$
$0 < s_t < 1$
$K_j$=Joystick Const
$K_t$=Tactile Sensor Const
$s_j$=joystick sensor
$s_t$=tactile sensor It is noted that during periods when the neither the joystick nor tactile sensor are engaged, the output of this weighting may not be non-zero. However as such an occurrence will cause an interrupt signal is sent to the navigation algorithm signaling the vehicle to stop, this weighting will be ignored.

Figure 5:
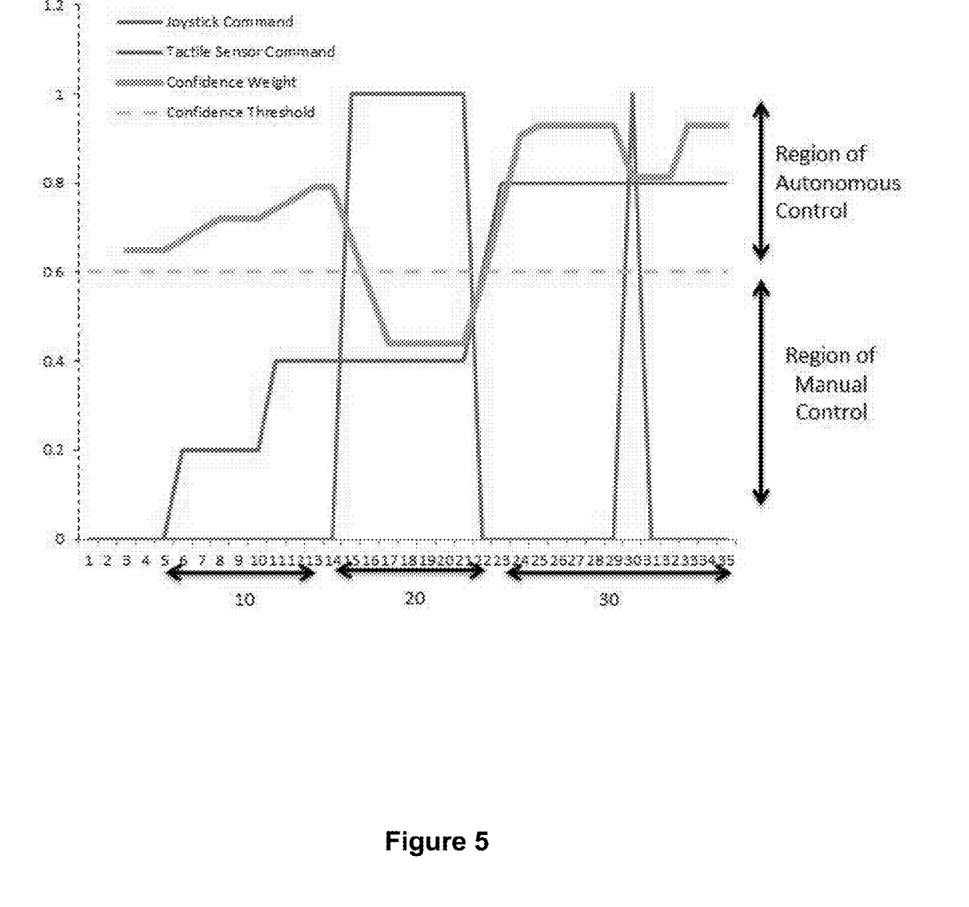
FIG. 5 illustrates a timing diagram showing how the vehicle switches between different modes depending on the confidence level calculated.

FIG. 5 illustrates a timing diagram showing how the vehicle switches between different modes depending on the confidence level calculated. In section 10 of the graph Vehicle starts off in autonomous mode with medium confidence level. In section 20 shown joystick is activated and confidence level drops. Manual control assumed when confidence falls below threshold. In section 30 autonomous control regained with a high confidence level. Discrete input passed to controller at t=~29. Note that system remains in autonomous control despite signal.

Control Weight #2—Interrupt Weight

The second weight is designed to respond to instances when the user assumes control from the autonomous controller (i.e. when the user uses the joystick to manually provide feedback and/or assert control). Control weight #2 can be thought of as a measurement of the rate of change of control weight #1.

The first step to achieve this is to record gradients in the joystick control signal. This can be achieved by convolving the array of time-elapsed joystick values with a 1D edge detection filter.

$$\overline{W}_2 = S_j \otimes [-1\ 0\ 1]$$

Then to determine if a joystick command was issued:

$$\sum_{i=0}^{n}(\text{abs}(\overline{W}_{2,i})) = \begin{bmatrix} \text{positive integer if joystick pressed} \\ 0 \quad \text{otherwise} \end{bmatrix}$$

If the joystick command was applied, determine if the command should be interpreted as an impulse (used when providing discrete feedback to navigation algorithm) or as a continuous signal (used when assuming manual control).

$$\sum_{i=0}^{n}(\overline{W}_{2,i}) = \begin{bmatrix} 0 \quad \text{if impulse} \\ \text{positive integer if } contineous \end{bmatrix}$$

Depending on whether the joystick was activated and in what way the following weight will be passed to the navigation algorithm.

$$W_2 = \begin{bmatrix} 0 \quad \text{if no joystick command detected} \\ 1 \quad \text{if impulse} \\ 0 < W_2 < 1 \quad \text{if command detected} \end{bmatrix}$$

It is important to note that this weighting is decoupled from the first weighting (discussed above) and is not used by the primary control program in determining instantaneous motor commands. Instead it is used as a mechanism through which the operator can provide discrete feedback to the system (i.e. supposing the vehicle approaches a junction and is unsure which path to take, a short jolt of the controller in the desired direction will (1) not cause the vehicle to move in the indicated direction directly—as the signal will be filtered out by the low pass filter (2) the jolt of the joystick will cause the value of the second weighing to increase. If the confidence level is below a threshold, this change in weighting will serve as an input to the navigation program and from this the program will ascertain the user wishes to move in the suggested direction). Additionally these discrete feedback instances can be used by machine learning programs to better understand the relationship that the operator has with a given environment (i.e. which routes are most frequently traversed, which rooms are most often visited).

Program #2—Associated with Interpreting Information Provided by Program #1 and Program#3

The second program that is running is the navigation program. This code can utilize a wide variety of navigation algorithms however each require input from the system's sensors and input from the user control unit.

In this instance the weights passed from analysis of the control signal serve to modify the systems behaviour in the following ways:

If the control weight #1 is zero (user not touching joystick or the tactile sensor) the system will stop indefinitely. Activating the controls will cause the weightings to (slowly) rise and the vehicle will move again.

When the user is operating the joystick (low confidence values—low control weight #1), the vehicle will follow the general direction that the user suggests. As the navigation algorithm is still reading sensor readings and passing on the control signals to the motors, should a crash/impact become a likelihood (and in the advent of human) intervention, the vehicle will automatically stop until the threat is removed.

When the confidence levels are at medium values (user has 1-2 fingers on touchpad in one embodiment), the computer assumes autonomous control of the vehicles movement. However during these periods it is possible to directly modify the vehicles behaviour without assuming full manual control by applying a step impulse to the joystick (will affect control weighting #2 but will be damped out by control weight #1 which is responsible for direct control). This impulse will be detected by weight #2 and be used in adjusting the systems world model which will in turn interact with the navigation program.

At high confidence levels (user has 3-4 fingers on touchpad in one embodiment), the computer assumes autonomous control of the vehicles movement. In this instance, the navigation program will operate with greater certainty (i.e. faster speeds, smoother path). Similarly application of step impulses to the joystick will serve to affect control weight #2 but not control weight #1.

Program #3—Responsible for Path Planning, Machine Learning and Other High Level Functionality This third program runs and interacts simultaneously with the navigation program. The model program possesses knowledge relating to the location where the machine is operating and the habits/preferences of the user. It is ultimately this program that does the high level task of calculating where the machine needs to move in order to get to its desired destination. Once computed this information is fed back to the navigation program which looks after the lower level task of controlling motors, reading sensors etc.

The model is updated in real-time using data from the filtered sensor readings passed on from the navigation program and the second weighting value which is indicative of the user wishing to provide real-time feedback/guidance to the navigation process.

It will be appreciated that in all instances the operator is always in control of the vehicle, even when the vehicle is moving autonomously. This is distinctly different from prior art systems where the computer has full control and it's the users responsibility to interrupt the computer in case of a problem.

In this invention, once the user has their hands on either touchpad or joystick they are controlling the vehicle or robot and are therefore responsible for the vehicles behaviour (assuming there are no hardware problems). Therefore the user is always either controlling the vehicle directly (using joystick) or indirectly (using the touchpad). Only when the user takes their hand off the both the joystick and the touchpad do they surrender control and only is the vehicle or robot guaranteed to stop. Therefore in order to control the robot the control panel sends multiple continuous signals to the central control program.

Example Usage

1. Semi-autonomous wheelchair
   Driver enters destination. As long as the driver keeps fingers on the touchpad (or fingers depressing the trigger), the vehicle will move autonomously to destination.
   Driver can stop chair by taking hand off panel.
   Driver can resume manual control by operating the joystick
   Driver can issue discrete commands by jerking joystick
   Even if driver is manually directing wheelchair into object, wheelchair will detect object and override
2. Semi-Autonomous Robot
   Same operating principles as above
   Particularly useful when navigating robot where its operating out of sight of the user—i.e. use manual control when robot is in the same room as the operator and operator can see the robot and surroundings. Use autonomous control when robot is operating in another room or out of the field of vision of the operator.
   There are some specific applications where human remote control is dangerous/unreliable and robots are better suited (i.e. difficult for a human to remote control a robot up a flight of stairs without making it pitch). In these instances it may make sense for the human to operate manual control during precise operations and allow the robot to control its movements when more reactive control required (i.e. a human may control the manipulator or a bomb disposal robot but perhaps when it is traversing across rough terrain, it could do it better autonomously).
3. Semi-autonomous Control of a multi-segmented robotic mechanism
   Particularly relevant for applications where the complexity of the inverse kinematics control problem makes direct manual teleoperation impractical
   Human user may manually position the initial position of the joint/linkage using joystick.
   Human user can then use tactile sensor to enable the onboard computer to control fine control and execute more complex paths
   Discrete feedback can be applied during autonomous operation in the same manner as described It will be appreciated that the mechanical design of device enables it to be easily used by both right-handed and left-handed people, as device can be attached to either arm of the wheelchair and the joystick is located directly in front of sensitive touch panels.

The design of the interface and corresponding control system enables the control system to be easily and safely used with no training and without personalised adjustment of the interface The control interface provides a much more robust and reliable than other more complex systems that depend on voice recognition, eye tracking etc.

Figure 6A:
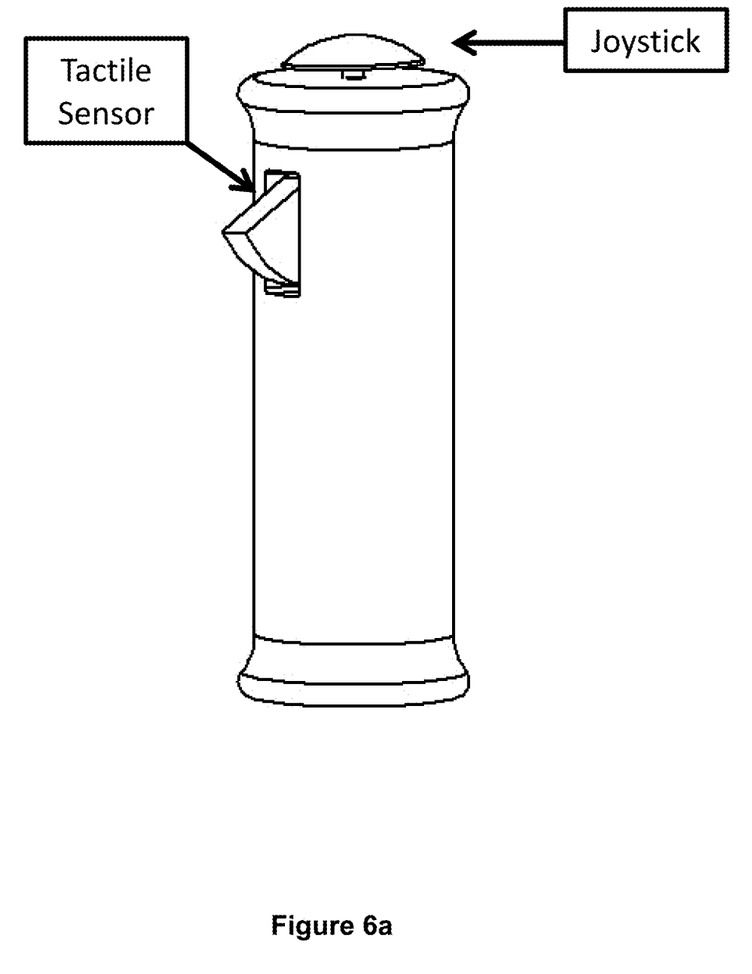
FIGS. 6a and 6b illustrates an alternative embodiment of the present invention where the touch panel is integrated into a joystick mechanism.
Figure 6B:
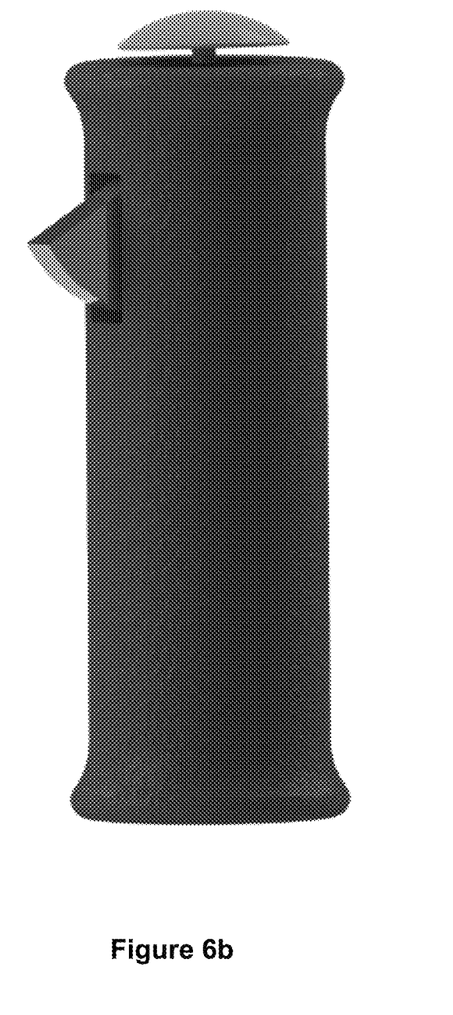

FIG. 6a and FIG. 6b illustrates an alternative embodiment of the invention where the touch panel is incorporated as a pressure sensitive trigger in a handheld joystick.

In FIG. 6, the device is meant to be held like you would hold the stock of a gun. The amount the trigger is depressed corresponds to the confidence (i.e. the number of fingers on the touchpad in the example described above)—trigger depressed=autonomous control (high weight), trigger released=(low weight) the joystick is controlled by the thumb and once depressed it will affect the weights in exactly the same was as hereinbefore described.

It will be appreciated that the control interface of the present invention has many applications such as a robotic porter for hospitals—patients sit in robot wheelchair and are navigated to where they need to go. For use on electric golf caddy—autonomous mode follows golfer, manual mode golfer controls movement directly, Catering trolleys, Warehouse vehicles, co-operative mobile robots. For use in buildings where people constantly need to be directed to certain locations (i.e. hotel, airport, shopping centre), Street cleaners, Manned lawnmowers etc. The control interface, as hereinbefore described, has applications outside of vehicle navigation. Particularly useful for control of complex mechanisms where user will struggle to manage complex inverse kinematics i.e. multi-segmented vehicles (i.e. a robot arm—human positions it to an approximate location, autonomous controller responsible for fine grasping.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A control interface configured to cooperate with a vehicle said interface comprising at least one sensor adapted to detect the presence of at least one finger of a user and to act as a switching mechanism between manual and autonomous control of the vehicle.

2. The control interface of claim 1 wherein a plurality of sensors touched by the user determines a navigation confidence of the vehicle.

3. The control interface of claims 1 wherein when no sensors are touched by the user the vehicle operates in a stopped mode.

4. The control interface as claimed in claim 1 wherein at least one sensor comprises a touch panel sensor.

5. The control interface as claimed in claim 1 comprising a joystick control adapted to provide manual control/feedback.

6. The control interface of claim 1 wherein a processor comprises a module for generating confidence weighting based on the user data collected from the sensor or a joystick wherein said weighting affects the speed at which the vehicle operates.

7. The control interface of claim 6 wherein a low confidence score weighting will generate a command from the processor to slow the vehicle and make the processor more sensitive to its surroundings.

8. The control interface of claim 6 wherein a high confidence score weighting generated will reinforce the processor control output and consequently the vehicle can travel faster than in a low confidence mode.

9. The control interface of claim 6 wherein the weighing calculates the running average over a pre-determined period of time of whether the user has their hand over the sensor or a joystick.

10. The control interface of claim 9 wherein a normalised value ~0 indicates that the user is controlling exclusively using the joystick.

11. The control interface of claim 9 wherein a normalised value ~1 indicates that the tactile sensor is being used.

12. The control interface of claim 1 wherein a second weighting can be calculated to calculate the rate of change of a first weighting indicative of how fast the user is going from autonomous to tele-operated control such that the second weighting will indicate periods when the user has assumed control of the vehicle for a particular reason.

13. The control interface of claim 12 wherein a processor will analyse the choices the user made during these periods such that when a similar situation is reached in the future, the processor will be able to better predict the desired behaviour.

14. The control interface of claim 1 wherein the vehicle comprises a wheelchair.

15. The control interface of claim 1 wherein the vehicle comprises a robotic device.

16. A semi-autonomous robotic vehicle comprising the control interface of claim 1.

17. A method controlling a vehicle, such as a wheelchair or robot, comprising the steps of:
- configuring a control interface to cooperate with the vehicle;
- detecting the presence of at least one finger on the control interface and calculating a navigation confidence weighting; and
- switching between manual and autonomous control of the vehicle based on said confidence weighting.

* * * * *